United States Patent
Goyer et al.

(10) Patent No.: US 11,353,054 B2
(45) Date of Patent: Jun. 7, 2022

(54) POSITIVE LOCKING FASTENER

(71) Applicant: LISI AEROSPACE, Paris (FR)

(72) Inventors: Julien Goyer, Saint Gratien (FR); Mohamed Abou Halima, Gennevilliers (FR); Loïc Meiffre, Conflans Sainte-Honorine (FR)

(73) Assignee: LISI AEROSPACE, Paris (FR)

( * ) Notice: Subject to any disclaimer, the term of this patent is extended or adjusted under 35 U.S.C. 154(b) by 380 days.

(21) Appl. No.: 16/622,932

(22) PCT Filed: Jun. 14, 2018

(86) PCT No.: PCT/FR2018/051416
§ 371 (c)(1),
(2) Date: Dec. 14, 2019

(87) PCT Pub. No.: WO2018/229445
PCT Pub. Date: Dec. 20, 2018

(65) Prior Publication Data
US 2021/0190125 A1     Jun. 24, 2021

(30) Foreign Application Priority Data

Jun. 15, 2017  (FR) ........................... 1755417

(51) Int. Cl.
*F16B 39/08*     (2006.01)
*F16B 37/14*     (2006.01)

(52) U.S. Cl.
CPC ............ *F16B 39/08* (2013.01); *F16B 37/14* (2013.01)

(58) Field of Classification Search
CPC .......... F16B 21/12; F16B 37/14; F16B 39/04; F16B 39/08; F16B 39/10; F16B 39/14;
(Continued)

(56) References Cited

U.S. PATENT DOCUMENTS 1,305,698 A  *  6/1919  Day ..................... F16B 39/10
                                                      411/933
2,365,433 A     12/1944  Polizzi
(Continued)

FOREIGN PATENT DOCUMENTS

EP     0576871     1/1994
EP     1496274     1/2005
(Continued)

OTHER PUBLICATIONS

Pöll, Andreas, International Search Report, dated Oct. 18, 2018, 4 pages, European Patent Office, P.B. 5818 Patentlaan 2, NL-2280 HV Rijswijk, Netherland.
(Continued)

*Primary Examiner* — Roberta S Delisle
(74) *Attorney, Agent, or Firm* — Henricks Slavin LLP

(57) ABSTRACT

The invention relates to a positive locking fastener comprising: a screw (1) having a cavity (110) at a threaded portion (11); a nut (2) having a tightening portion (21); a first cap (3); a second cap (4); and a pin (5). The first cap is suitable for being inserted into the cavity of the threaded portion. The second cap has a locking portion (402) intended to engage with the first cap and a blocking portion (401) intended to engage with a tightening portion (21) of the nut. The locking portion of said second cap comprises openings (4020) suitable for allowing the pin to be inserted through said openings in order to hold the first cap and the second cap together. The invention also relates to a method for implementing the fastener according to the invention.

14 Claims, 4 Drawing Sheets

(58) Field of Classification Search
CPC ........ F16B 39/34; F16B 39/36; Y10S 411/91;
Y10S 411/924; Y10S 411/929
USPC ............. 411/190, 191, 259, 260, 315, 372.5,
411/372.6, 513
See application file for complete search history.

(56) References Cited

U.S. PATENT DOCUMENTS

| | | | |
|---|---|---|---|
| 3,548,704 A | 12/1970 | Kutryk | |
| 4,505,628 A * | 3/1985 | Meibuhr | F16B 39/10 411/315 |
| 5,360,303 A | 11/1994 | Behrens et al. | |
| 7,090,454 B2 * | 8/2006 | Shain | F16B 21/065 411/432 |
| 8,366,367 B2 * | 2/2013 | Matlock | F16B 37/14 411/429 |
| 2017/0102023 A1 | 4/2017 | Schepergerdes | |
| 2020/0149580 A1 * | 5/2020 | Abou Halima | F16B 39/08 |
| 2020/0248737 A1 * | 8/2020 | Meiffre | F16B 37/14 |
| 2021/0190125 A1 * | 6/2021 | Goyer | F16B 39/08 |

FOREIGN PATENT DOCUMENTS

| | | |
|---|---|---|
| EP | 2044342 | 9/2014 |
| EP | 3104027 | 12/2016 |
| FR | 615364 | 1/1927 |
| FR | 825722 | 3/1938 |
| FR | 1557874 | 2/1969 |
| JP | S5388657 | 7/1978 |
| JP | H01146009 | 10/1989 |
| JP | 3629486 | 3/2005 |

OTHER PUBLICATIONS

Pöll, Andreas, Written Opinion, dated Oct. 18, 2018, 6 pages, European Patent Office, D-80298 Munich, Germany.

* cited by examiner

POSITIVE LOCKING FASTENER

CROSS REFERENCE TO RELATED APPLICATIONS

This application is a National Stage of International Application No. PCT/FR2018/051416, filed Jun. 14, 2018, which claims priority from FR1755417 filed Jun. 15, 2017, the entire contents of which are incorporated herein by reference.

TECHNICAL FIELD

The invention belongs to the field of mechanical fasteners.

More particularly, the invention relates to the field of mechanical attachments with positive locking.

STATE OF THE ART

A problem raised by the fastening mode of a structural assembly by threaded fasteners is that of loosening in use, generally due to vibrations. Positive locking devices are provided to solve this problem.

It is known practice to use locking wires to avoid loosening of the fasteners by vibration. A disadvantage of such wires is that they do not sufficiently limit the looseness of the fasteners.

European patent application EP 2 044 342 describes a positive locking fastening system comprising a screw, a nut, a locking member with a threaded projection and a coupling member. The screw comprises an external thread and an open cavity comprising an internal thread adapted to receive the threaded projection of the locking member. During assembly of the fastener, the nut is tightened onto the thread of the screw, the threaded projection of the locking member is engaged in the threaded cavity of the screw until the locking member bears on the nut. The coupling member is then placed on the locking member and the nut to ensure the absence of relative rotation of these elements.

The profile of the locking member and the nut is such that it is not always possible to place the coupling member in place without adjusting the tightening of the locking member, in order to align the outer profiles of the locking member and the nut.

A drawback of this system is that such an adjustment results in excessive or insufficient tightening of the locking member, at the risk of causing, for example, deformations of the fastening system or in operation to a less well controlled loosening of the fastening system.

The assembly of the fastener is therefore not always possible optimally regardless of the position of the nut after being tightened on the screw and generally requires an operation of adjusting the tightening of the nut.

Japanese patent application JP 3629486 describes a positive locking fastener comprising a screw, a nut and a cap. The cap comprises a lower portion with a star-shaped polygonal cross-section having M apexes adapted to engage with the nut, and an upper portion adapted to engage with an engagement portion of the screw with a star-shaped polygonal cross-section having N apexes. An angular clearance provided between the lower part and the nut and an angular clearance provided between the upper part and the engagement part of the screw make it possible to engage the cap on the screw and the nut for a number of positions of the given cap by the largest common divisor of M and N. The sum of the angular clearances is given by a ratio between 180° and the smallest common divisor of M and N.

In order to limit the loosening of the presented fastener, it is necessary to have the smallest possible angular clearances, and therefore a smaller multiple of M and N as large as possible. As a result, this fastener is particularly suitable for screw/nut assemblies making it possible to obtain a larger common divisor as small as possible.

A drawback of this invention is therefore that the cap cannot engage both the screw and the nut from the first time than in a restricted number of positions, depending on the values of M and N. It is therefore necessary to remove the cap and plastically deform it, and then to re-engage the screw and the nut.

Furthermore, the number of positions of the cap allowing it to be engaged on the fastener must be limited only to increase the possibility of loosening the fastener.

Another drawback of the described fastener is that it can only be used a limited number of times, about two or three, due to the crimping of the cap into the groove of the nut, and disassembly by a hub breaker that necessarily damages the cap.

SUMMARY OF THE INVENTION

The invention proposes to solve the problems of the prior art.

The invention relates to a positive locking device intended to limit the loosening of a nut installed on a screw, said screw extending along a longitudinal axis, said nut having an angular period tightening portion θ, said locking device comprising a first cap and a second cap. According to the invention:

the first cap, having a main axis substantially coincident with the longitudinal axis when the device is in place, comprises:
    means for centering and immobilizing in rotation intended to cooperate with a free end of the screw;
    axial translation blocking means for cooperating with a thread of the screw, and a cylindrical outer surface of a guide parallel to the longitudinal axis;
the second cap, having a main axis substantially coincident with the longitudinal axis when the device is in place, is adapted to cooperate with the nut and engage with the first cap, and in that said second cap comprises:
    a blocking portion at a first end, an inner surface of said blocking portion having in a plane perpendicular to the main axis of said second cap an internal profile of angular period θ/k, where k is a non-zero natural integer, around the main axis of said body, dimensions of the profile being adapted to allow the locking portion to be placed on the tightening portion of the nut, and when said tightening portion is inserted into said locking portion, allow a relative rotational movement of said nut with respect to said locking portion, about the longitudinal axis, of angular amplitude θ/2k;
    a locking portion at a second end having a set of openings passing through said locking portion and intended to receive a pin;
said blocking and locking portions being secured and fixed together;
an inner surface of the locking portion of the second cap and the outer surface of the first cap are adapted to engage with each other with an angular pitch θ/2k.

In one embodiment, the outer surface of the first cap has at least one tab, and the inner surface of the locking portion of the second cap has a set of splines adapted to receive the at least one tab of the first cap.

In one embodiment, the inner surface of the locking portion of the second cap has at least one tab, and the outer surface of the first cap has a set of splines adapted to receive the at least one tab.

In one embodiment, the outer surface of the first cap and the inner surface of the locking portion both have a set of splines, separated by a θ/2k angular pitch.

In one embodiment, k is 1.

In one embodiment:
the first cap has a plate substantially perpendicular to the main axis of said first cap;
the means for centering and immobilizing the first cap comprise a central pillar of substantially cylindrical shape with a non-circular cross-section, said central pillar extending from a central area of the lower face of the plate in the direction given by the main axis of the first cap;
the means for blocking in axial translation of said first cap comprise at least one foot extending in a direction of the main axis from the lower face of the plate, said at least one foot comprising a claw extending in a plane substantially perpendicular to the main axis from the at least one foot towards said central pillar, said at least one foot being made of an elastic material to allow the fitting of the at least one foot into a thread of the screw.

In one embodiment, the first cap has four legs.

In one embodiment, the central post has a cylindrical shape with a polygonal cross-section.

In one embodiment, the apertures are notches.

In one embodiment, the apertures are oblong holes.

The invention also relates to a positive locking fastener comprising:
a screw having a longitudinal axis and comprising at a first end a head and at a second free end a threaded portion comprising a cavity opening onto said second free end of the screw;
a nut intended to be placed on the screw, said nut comprising a tightening portion, an outer surface of which defines, in a plane perpendicular to the longitudinal axis, an angular period profile θ;
said fastener being characterized in that it further comprises:
a positive locking device according to any one of the preceding examples, the centering and immobilizing means of the first cap co-operating with the cavity in order to immobilize said first cap in rotation relative to the screw, the axial translation locking means of which co-operate with a thread of said screw in order to immobilize said first cap in axial translation relative to said screw, a radial dimension of the profile being adapted to allow insertion of the tightening portion into the locking portion;
a pin for insertion into the openings of the second cap so as to hold together the first cap and the second cap.

In one embodiment:
an inner surface of the cavity forms a complementary cavity of the central pillar such that said central pillar is adapted to be inserted into said cavity;
the claws of the first cap are fitted into the thread of the screw.

In one embodiment:
the nut defines a star-shaped profile at twelve vertices of angular period 30°;

the outer surface of the first cap consists of twenty-four tabs separated by an angular pitch of 15°.

The invention also relates to a method for implementing a fastener according to the invention. The method according to the invention comprises the following steps:
inserting the screw into a previously made hole in a structural assembly consisting of structural elements to be held together;
placing the nut on the screw by applying a tightening torque;
placing the first cap on the screw;
installing the second cap;
if the second cap engages with the first cap but does not cooperate with the tightening portion of the nut, removing said second cap in the direction of the longitudinal axis, directly or indirectly rotating said second cap about said longitudinal axis, by an angle equal to θ/2k, then reengaging said second cap, this step being repeated, always in the same direction of rotation, until the second cap is engaged on the tightening portion of said nut;
insertion of the pin into the openings.

BRIEF DESCRIPTION OF THE FIGURES

The invention will be better understood on reading the following description and examining the accompanying figures. These are presented only by way of non-limiting indication of the invention.

The figures are schematic diagrams proposed for a good understanding of the invention and are not necessarily scaled.

DETAILED DESCRIPTION

In the description, the terms "lower", "upper", "horizontal" and "vertical" should be interpreted with reference to the configuration of the elements on the drawings and to the associated orthonormal coordinate system (ODT), the axis (OZ) of which corresponds to the direction of a longitudinal axis of the fastener.

A "vertical" direction ΔL is given by the direction of the axis (OZ). Any axis of the plane (OXY) therefore has a "horizontal" direction.

A "lower" portion of an element, respectively an "upper" portion, has to be understood as being a part of which the constituent points have lower, respectively higher z-dimensions, than those of the constituent points of an "upper" portion, respectively "lower" of the same element.

Figure 1A:
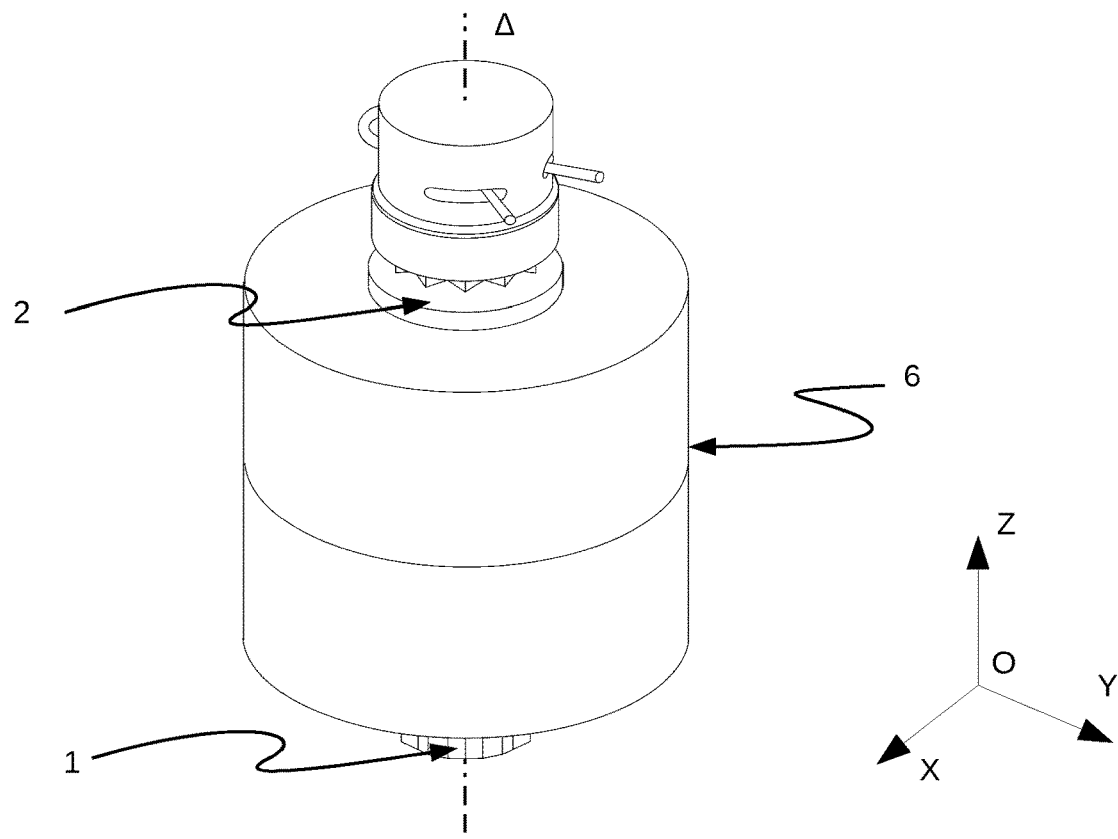
FIG. 1a shows an isometric view of a positive locking fastener according to the invention, holding a structural assembly, in an exemplary embodiment of the invention.
Figure 1B:
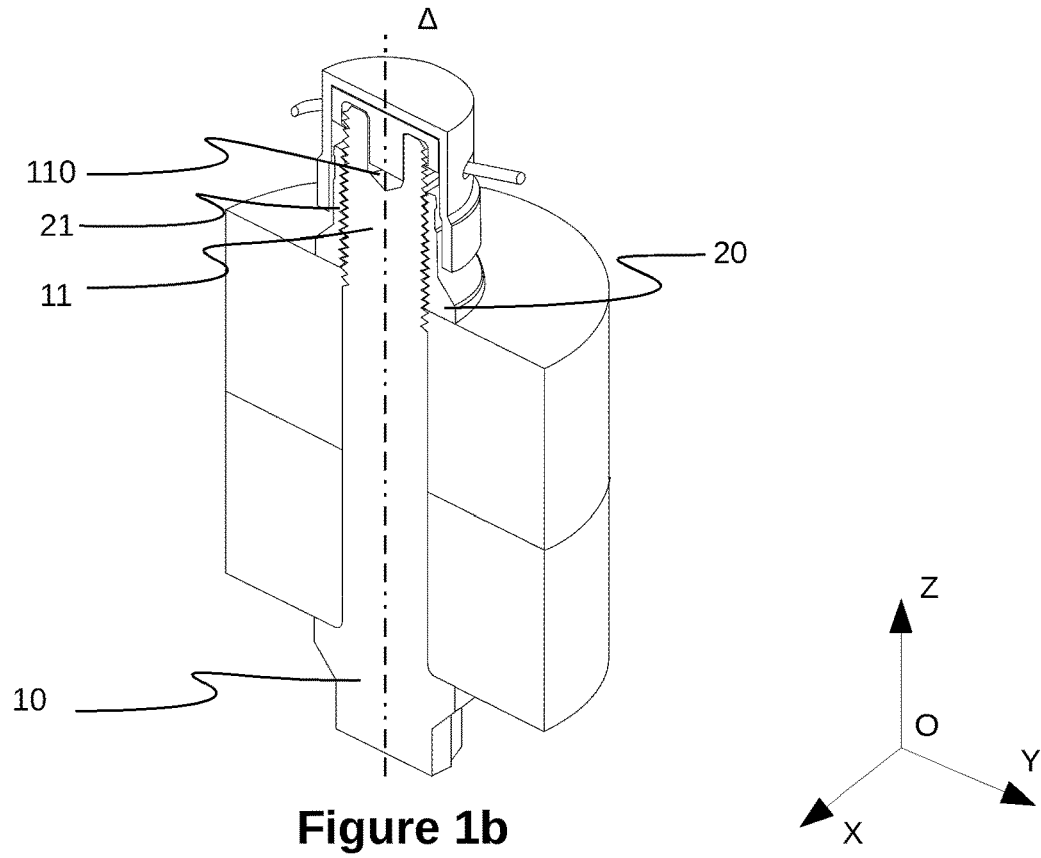
FIG. 1b shows an isometric view with cross-section along the plane (OYZ) of the locking device in the embodiment of FIG. 1

With reference to FIGS. 1a and 1b, a positive locking fastener according to the invention comprises:

a fastener, comprising a screw 1 and a nut 2, holds together two structural elements forming a structural assembly 6;
a first cap 3;
a second cap 4;
a pin 5.

The screw 1 extends along a longitudinal axis Δ and has at a first end a head 10 and at a second end a threaded portion 11. The threaded portion 11 has a cavity 110 extending axially and opening onto the second end.

When the screw 1 is installed, the nut 2 is tightened onto the threaded portion 11 of said screw with the application of a nominal tightening torque, so that the structural elements of the structural assembly 6 are held together by the nut 2 and the screw 1 with the desired pre-tensioning force.

The nut 2 comprises a base 20, in contact with the structural assembly 6, and a tightening portion 21 allowing the application of the tightening torque, for example by means of a tool comprising a socket with a complementary shape of said tightening portion.

Figure 2:
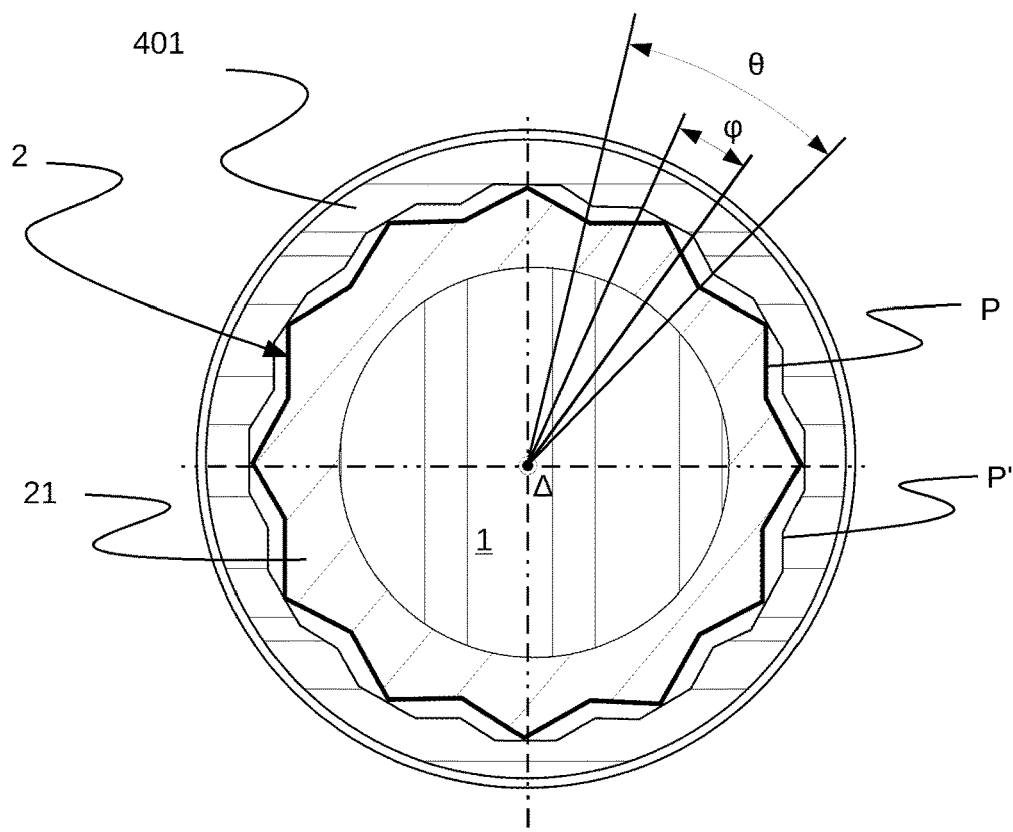
FIG. 2 shows a cross-sectional view of the fastener according to the invention in a horizontal plane intersecting the tightening portion of the nut, in the embodiment of FIG. 1A.

With reference to FIG. 2, the tightening portion 21 of a twelve-sided nut has an outer face defining, in a horizontal plane, a star-shaped profile P at twelve vertices, shown in thick solid line in the figure, said profile thus having an angular period θ of 30° about an axis substantially coincident with the longitudinal axis Δ when the nut 2 is installed.

Figure 3:
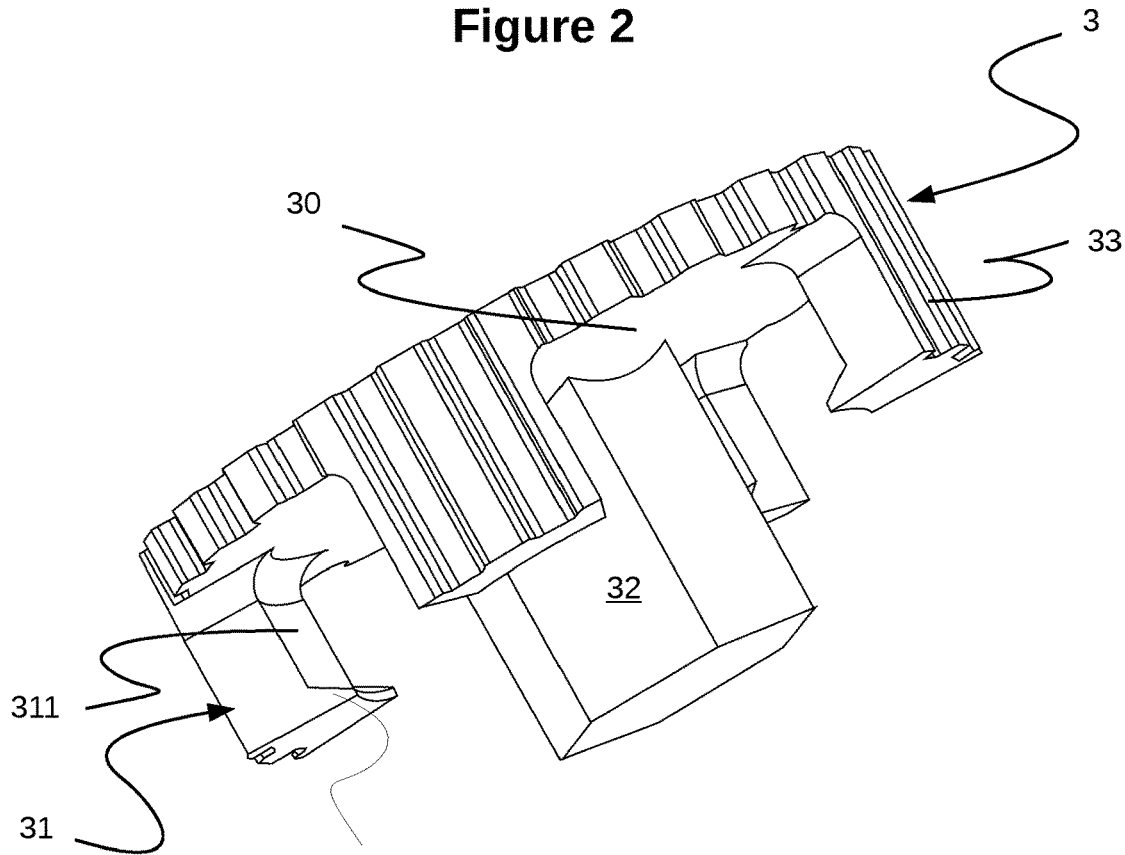
FIG. 3 shows an isometric view of the first cap according to the invention.

With reference to FIGS. 1b and 3, after placing the nut 2 on the screw 1, the first cap 3 according to the invention is installed, a periphery of the first cap 3 being able to at least partially cover the threaded portion 11 of the screw 1 and to be fitted into a thread of said threaded portion.

With reference to FIG. 3, the first cap 3 has a circular plate 30 and a set of four identical feet 31 arranged regularly on a periphery of said plate. The feet 31 extend from a lower face of the plate 30 in a given direction by a main axis of the plate 30, said main axis is substantially coincident with the longitudinal axis Δ when the first cap 3 is installed.

An outer surface of each of the feet 31 constitutes an extension of a peripheral outer surface of the plate 30 in order to form a peripheral surface 33 of the first cap 3, which peripheral surface has a set of splines oriented along the main axis of the first cap 3.

In an alternative embodiment, not illustrated, the feet 31 do not constitute an extension of the peripheral outer surface of the plate, and the peripheral surface 33 corresponds to said peripheral outer surface of the plate.

In the exemplary embodiment illustrated, the number of splines is equal to 24, such that a spline is observed by angular pitch of 15° about the main axis of the first cap 3, said angular pitch being equal to half the angular period θ of the profile P of the tightening portion 21.

The feet 31 also have a claw 310 extending radially, from a lower end of an inner surface 31 of said feet 31, towards the main axis of the cap 3. A distance from the inner surface 311 of a foot 31 to the main axis of the first cap 3 is substantially equal to a maximum radius of the threaded portion 1 of the screw 1 such that the claw 310 of each of the feet 31 is adapted to be fitted into the thread of the threaded portion 11.

The feet 31 are made of an elastic material so as to allow the fitting and uncoupling of said claws without damage to the first cap 3. The elastic properties of the material constituting the feet 31 take account in particular of the helical shape of the thread of the threaded portion 1 involving differentiated interlocking from one foot to the other and therefore different stresses.

The first cap 3 also comprises a central pillar 32 of substantially cylindrical shape with a hexagonal cross-section extending from a central zone of the lower face of the plate 30 in the direction given by the main axis of the first cap 3. The central pillar 32 has a shape complementary to that of the cavity 110, so that the central pillar 32 can be inserted without substantial clearance in said cavity.

The cavity 110 and the central pillar 32 have shapes adapted to make rotation of the first cap 3 impossible with respect to the screw 1. In order to make it "impossible to rotate it", it must be understood without damaging the first cap 3 and within the limits of necessary or inevitable clearance to allow the mounting of said first cap taking into account the manufacturing tolerances of said first cap and of the screw 1. The invention is of course not limited to the shape illustrated in the figures and the central pillar 32 and the cavity 1 can have other shapes adapted to make it impossible to rotate the first cap 3 around the screw 1, in particular they may have a cylindrical shape with a polygonal cross-section or a non-circular elliptical shape.

When the first cap 3 is placed on the screw 1, the central pillar 32 is inserted into the cavity 110 and a solid part of the threaded portion 11 surrounding said cavity is inserted between said central pillar and the legs 31, the claw 310 of each of said legs fitting into a thread of said threaded portion.

Once the first cap 3 is placed, the second cap 4 is installed over said first cap and the nut 2.

Figure 4:
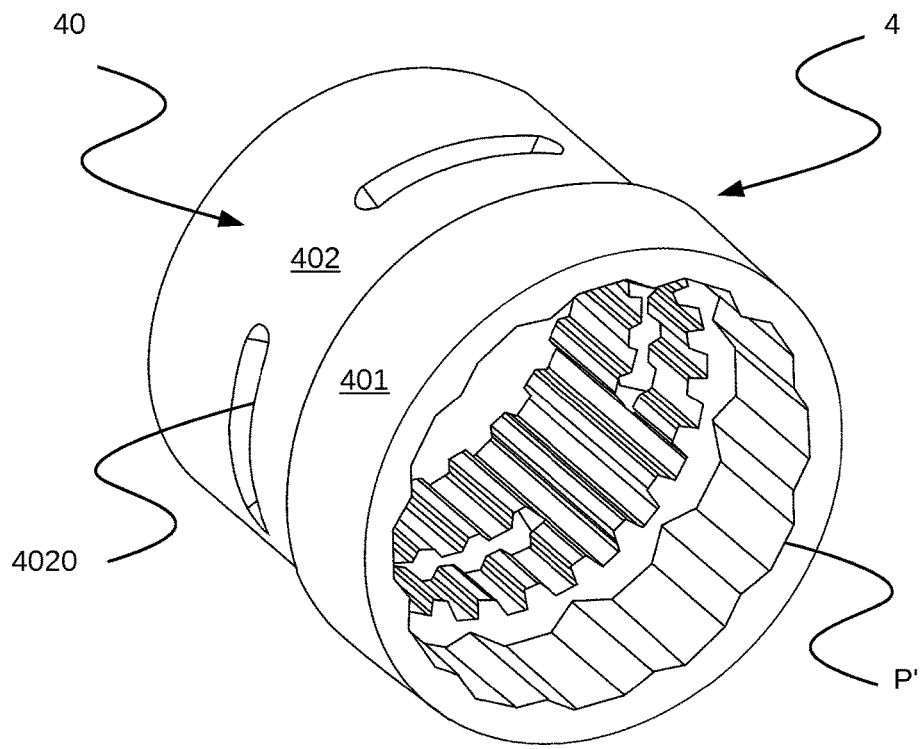
FIG. 4 shows an isometric view of the second cap according to the invention.

With reference to FIG. 4, the second cap 4 has a body 40 comprising a blocking portion 401 and a locking portion 402. The body 40 has an inner surface adapted to allow the blocking portion 401 to cooperate with the nut 2 and to the locking portion 402 to cooperate with the first cap 3.

An inner surface of the blocking portion 401 has, in a plane perpendicular to a main axis of the body 40 substantially coincident with the longitudinal axis Δ when the second cap 4 is set in place, a crenellated profile P' of angular period θ about the main axis of said body. The dimensions of the profile P and of the profile P' are adapted to allow the insertion of the tightening portion 21 into the blocking portion 401, and, when said tightening portion is introduced into said blocking portion, allow a relative rotational movement of said nut relative to said blocking portion, about the longitudinal axis Δ, with angular amplitude φ equal to half of the angular period θ, ie 15°, as illustrated in FIGS. 5a and 5b.

Figures 5A, 5B:
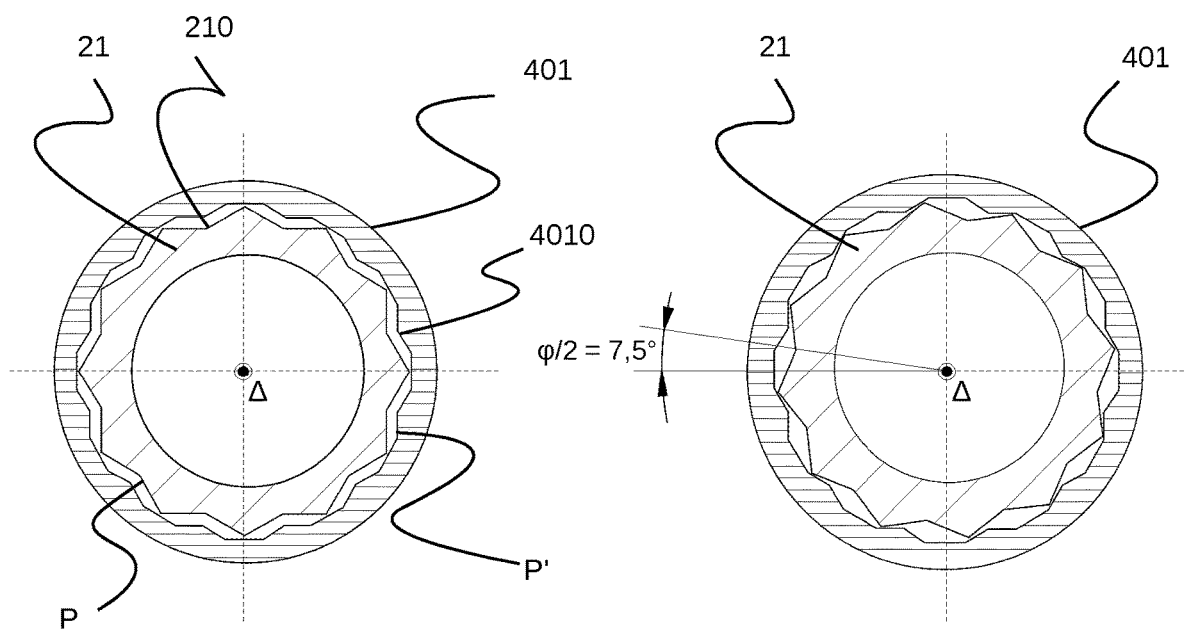
FIGS. 5a and 5b show two cross-sectional views of the fastener according to the invention in a horizontal plane intersecting the tightening portion of the nut and the locking portion of the second cap, in two different configurations.

FIG. 5a shows the tightening portion assembly 21 and blocking portion 401 in a first configuration in which internal vertices 210, 4010 of the profiles P and P' coincide, that is to say that two coincident internal vertices 210, 4010 form a line perpendicular to the longitudinal axis Δ.

FIG. 5b shows the same assembly in a second configuration corresponding to the first configuration in which the tightening portion 21 or the blocking portion 401 has undergone a rotation of 7.5°, ie an angular half-amplitude φ.

An inner surface of the locking portion 402 of the body 40 has splines oriented along the main axis of the second cap 4, such that the inner surface of said locking portion is able to engage with the peripheral surface 33 of the first cap 3. In particular, an average diameter of the first cap 3 is less than an average diameter of the second cap 4. Furthermore, the number of splines of the inner surface of the locking portion 402 is equal in the example shown to the number of splines present on the peripheral surface 33 of the first cap 3, and each spline of the inner surface is spaced from the adjacent splines by an angular pitch of 15° around the main axis of the second cap 4.

The role of these splines being to block the rotation between the first cap 3 and the second cap 4, it is not necessary in practice to have as many splines on the peripheral surface 33 than on the inner surface of the locking portion 402. In an alternative embodiment, not illustrated, the peripheral surface 33 comprises a number of splines less than the number of splines of the internal surface of the locking portion 402, spaced by a multiple angle of the angular pitch of 15°, for example three splines spaced by 30°. In an alternative embodiment, not shown, the splines of the peripheral surface 33 are replaced by a single tab. The term "tab" means a protruding strip forming a tenon on the peripheral surface 33 intended to enter, for assembly, in a groove close to the internal surface of the locking portion 402. In alternative embodiments, the internal surface of the locking portion 402 has a number of splines less than the number of splines of the peripheral surface (or even a single tab), according to the same principle.

Figure 7:
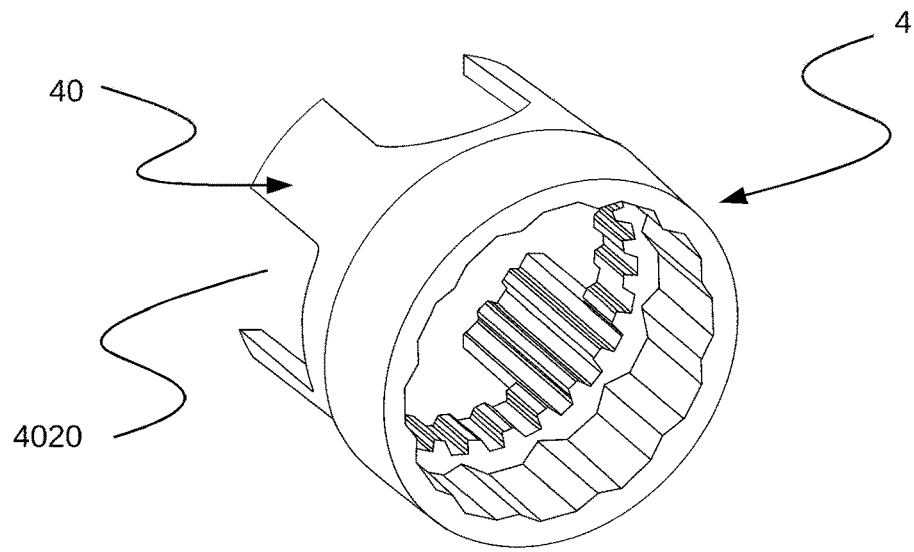
FIG. 7 shows an isometric view of the second cap according to the invention, in an embodiment in which the openings are notches.

The locking portion 402 also has two pairs of openings 4020 passing through said locking portion. The dimensions of the holes 4020 are adapted to receive a pin 5, the role of said pin being to block axially between them and on the screw 1 the first cap 3 and the second cap 4. The openings may be holes or notches as illustrated respectively in FIGS. 4 and 7.

Implementation of the positive locking fastener according to the invention is made in the manner described below.

Firstly, the nut 2 and the screw 1 are installed to hold the structural assembly 6.

The first cap 3 is then placed at the second end of the screw 1. The central pillar 32 is inserted into the cavity 110 of the threaded portion 11 and the claws 310 of the feet 31 are fitted into the thread of the threaded portion 11, these interlocking being made possible by an elastic nature of said feet. The engagement of these claws 310 in the thread thus makes it possible to block the translation of the first cap 3 along the main axis of said first cap, substantially coincident with the longitudinal axis Δ of the screw 1.

A person skilled in the art will understand that the number of feet is not critical for the implementation of the invention, insofar as a single foot makes it possible to block said translation of the first cap 3. Preferably, at least two diametrically opposite feet are used to ensure good holding of the first cap 3.

The second cap 4 is then put in place. Firstly, the second cap 4 is arranged such that the splines of the inner surface of the locking portion 402 engage with the splines of the peripheral surface 33 of the first cap 3, thus forming a set of sliding links allowing the translation of said second cap along the main axis of said second cap then substantially coincident with the longitudinal axis Δ, while blocking the rotation between the two caps 3, 4.

It should be noted that it is not necessary for the splines (or, where appropriate, the tab) extend all along the surfaces in contact for it is possible to block the rotation of the caps 3, 4 between them. In alternative embodiments, the splines only extend over a portion of said surfaces.

Subsequently, if the setting of the blocking portion 401 on the tightening portion 21 is impossible, the second cap 4 is removed by axial translation along the longitudinal axis Δ, and then is rotated about said longitudinal axis, in a direct or indirect direction, by an angle equal to φ. The second cap 4 is then replaced in an axial translation along the longitudinal axis Δ. In this new configuration, the second cap 4 may necessarily be placed on the tightening portion 21 of the nut 2.

This result comes from the choice of the angular spacing between the splines of the peripheral surface 33 and/or of the inner surface of the locking portion 402, and of the angular amplitude φ of clearance between the profiles P and P', both equal to half the angular period θ of the profiles P and P' of the tightening portion 21 and of the blocking portion 401. It is thus possible to implement the caps 3, 4 whatever the orientation of the nut 2 with respect to the screw 1, ie regardless of the degree of tightening of the nut 2 with respect to the screw 1.

Once the caps 3, 4 are put in place, the pin 5 is inserted into the openings 4020 of the said second cap. The pin 5 implemented in the illustrated example is a cotter pin. The arrangement of the openings 4020 is adapted to allow the pin 5 to be inserted between the feet 31 and the nut 2, advantageously in contact with the feet 31. The pin 5 thus makes it possible to block an axial translation of the second cap 4 relative to the first cap 3, and therefore relative to the screw 1.

The engagement of the second cap 4 with the nut 2 and with the first cap 3 therefore limits, in addition to the clearances necessary and inherent to the assembly, the rotation of the screw 1 and the nut 2 at an angular displacement φ, and thus limits loosening of the fastener.

An advantage of the invention is that it allows positive locking of the attachment regardless of the nominal tightening of the nut 2 during its installation by allowing in any case the installation of the device.

Figure 6A:
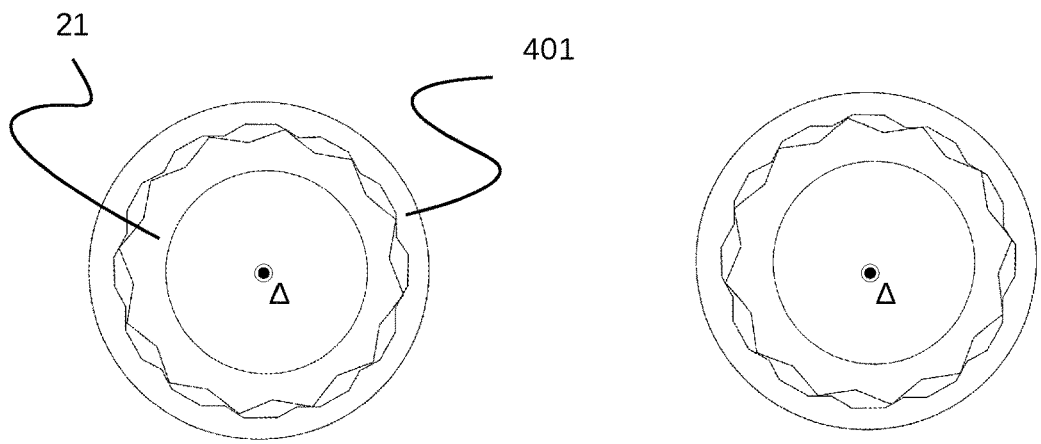
FIG. 6a shows two cross-sectional views of the fastener according to the invention in a horizontal plane intersecting the locking portion of the second cap.
Figure 6B:
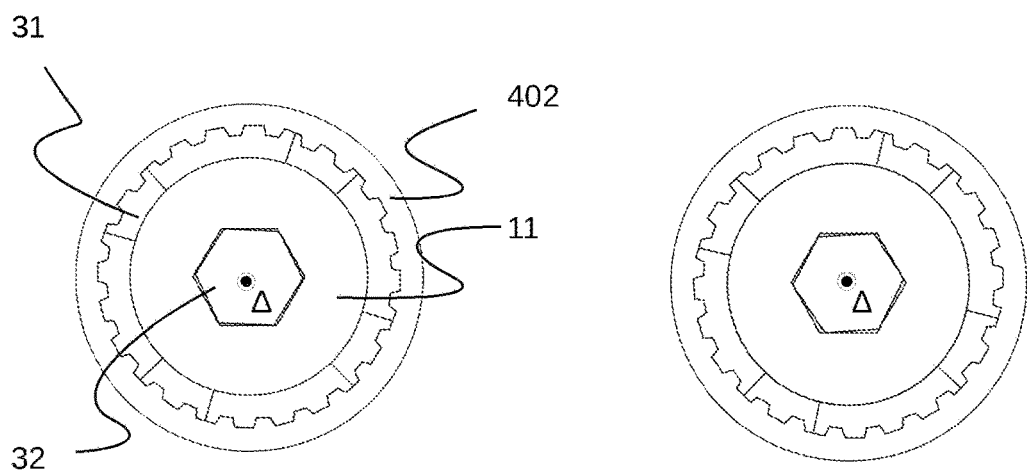
FIG. 6b shows two cross-sectional views of the fastener according to the invention in a horizontal plane intersecting the locking portion of the second cap.

Wth reference to FIGS. 6a and 6b, there are clearances between the elements of the fastener according to the invention.

For example, FIG. 6a illustrates the maximum angular clearance existing between the nut 2 and the second cap 4 in the event of a loosening of said nut. The left view and the right view illustrate the relative positions of the tightening portion 21 with respect to the locking portion 401 respectively before and after loosening the nut in the most pessimistic scenario of loosening said nut.

FIG. 6b illustrates the maximum clearance existing between the screw 1 and the first cap 3. The left view and the right view illustrate the relative positions of the threaded portion 1 and the central pillar 32 respectively before and after loosening the screw 1 in the most pessimistic scenario of loosening said screw.

There are also clearances between the caps 3, 4, not shown.

In practice, the fastener according to the invention has a maximum loosening of approximately 22° owing to the existence of these clearances, including in particular the angular amplitude φ of 15° as illustrated in FIG. 6a. This maximum loosening corresponds to a maximum preload loss of about 7.5%. The term "maximum preload loss" is understood to mean the loss of preload in the most pessimistic scenario of loosening of the fastener, taking into account the maximum possible rotation according to the principles discussed plus the adjustment for mechanical clearance compensation.

Although it is particularly suitable for a twelve-sided nut, a person skilled in the art will understand that the invention is not limited to the illustrated embodiment, and can be applied in particular to other nuts. However, it should be noted that the use of a different nut modifies the maximum preload loss. By way of example, the adaptation of the invention to a six-sided nut as described above leads to a maximum loosening greater than 30°, since the angular displacement of the nut 2 in the second cap 4 is then 30°. This leads to a maximum preload loss greater than 10%. In order to limit the maximum preload loss in this case, one solution is to keep the profile P' of the locking portion 401 of the second cap 4 determined in the case of a twelve-sided nut, so that the clearance angular position of the nut in the second cap is 15° instead of 30°. It can then be necessary, when installing the second cap (4), to repeat several times the step of removal, rotation, and re-use of the cap in order to find the position of said second cap allowing its engagement on the nut.

The invention claimed is:

1. A positive locking device intended to limit the loosening of a nut installed on a screw, said screw extending along a longitudinal axis ($\Delta$), said nut having a tightening portion of angular period $\theta$, said locking device comprising a first cap and a second cap to be assembled on the screw and nut when the nut is placed on the screw, the first cap and the second cap being characterized in that:
    the first cap, having a main first cap axis substantially coincident with the longitudinal axis ($\Delta$) when the first cap is placed on an assembly of a screw and a nut, the first cap comprising:
    means for centering and immobilizing in rotation configured to cooperate with a free end of the screw when the first cap is placed on the screw;
    axial translation blocking means configured to cooperate with a thread of the screw when the first cap is placed on the screw, and a guide cylindrical outer surface parallel to the main first cap axis;
    the second cap, having a main axis substantially coincident with the main first cap axis when the device is in place on an assembly of a screw and a nut, is configured to cooperate with such a nut and to engage with the first cap, and in that said second cap comprises:
    a blocking portion at a first end, an inner surface of said blocking portion having, in a plane perpendicular to the main axis of said second cap, an internal profile (P') of angular period $\theta/k$, where k is a non-zero natural integer, around the main axis of said body, dimensions of the profile (P') being configured to allow the blocking portion to be placed on a tightening portion of a nut when the second cap is placed on an assembly of a screw and a nut, and when such a tightening portion is inserted into said blocking portion, the dimensions of the profile (P') are configured to allow a relative rotational movement of said blocking portion with respect to said nut, about the main axis of said second cap, of angular amplitude $\theta/2k$;
    a locking portion at a second end having a set of openings passing through said locking portion and intended to receive a pin;
said blocking and locking portions being secured and fixed together; an inner surface of the locking portion of the second cap and the outer surface of the first cap are adapted to engage with each other with an angular pitch $\theta/2k$.

2. The device according to claim 1, wherein the outer surface of the first cap has at least one tab, and the inner surface of the locking portion of the second cap has a set of splines, adapted to receive the at least one tab of the first cap.

3. The device according to claim 1, wherein the inner surface of the locking portion of the second cap has at least one tab, and the outer surface of the first cap has a set of splines adapted to receive the at least one tab.

4. The device according to claim 1, wherein the outer surface of the first cap and the inner surface of the locking portion both have a set of splines, separated by an angular pitch $\theta/2k$.

5. The device according to claim 1 characterized in that k is equal to 1.

6. The device according to claim 1, characterised in that:
    the first cap comprises a plate substantially perpendicular to the main axis of said first cap;
    the means for centering and immobilizing the first cap comprise a central pillar of substantially cylindrical shape with a non-circular cross-section, said central pillar extending from a central area of a lower face of the plate in the direction given by the main axis of the first cap;
    the means for blocking in axial translation of said first cap comprise at least one foot extending in a direction of the main axis of said first cap from the lower face of the plate, said at least one foot comprising a claw extending in a plane substantially perpendicular to the main axis of said first cap from the at least one foot towards said central pillar, said at least one foot being made of an elastic material to allow the engagement of the at least one foot with a thread of a screw.

7. The device according to claim 6, characterised in that the first cap comprises four feet.

8. The device according to claim 6, wherein the central pillar has a cylindrical shape with a polygonal cross-section.

9. The device according to claim 1, wherein the openings are notches.

10. The device according to claim 1, wherein the openings are oblong holes.

11. A positive locking fastener comprising:
    a screw having a longitudinal axis ($\Delta$) and comprising at a first end a head and at a second free end a threaded portion comprising a cavity opening onto said second free end of the screw;
    a nut intended to be placed on the screw, said nut comprising a tightening portion of which an outer surface defines in a plane perpendicular to the longitudinal axis ($\Delta$) a profile (P) of angular period $\theta$; said fastener being characterized in that it further comprises:
    a positive locking device according to claim 1, wherein the means for centering and immobilizing the first cap cooperate with the cavity in order to immobilize said first cap in rotation relative to the screw, the axial translation locking means cooperating with a thread of said screw in order to immobilize said first cap in axial translation with respect to said screw, a radial dimension of the profile (P') being adapted to allow the insertion of the tightening portion into the blocking portion;
    a pin for insertion into the openings of the second cap so as to hold together the first cap and the second cap.

12. The fastening according to claim 11 wherein:
    the first cap comprises a plate substantially perpendicular to the main axis of said first cap;
    the means for centering and immobilizing the first cap comprise a central pillar of substantially cylindrical shape with a non-circular cross-section, said central pillar extending from a central area of the lower face of the plate in the direction given by the main axis of the first cap;

the means for blocking in axial translation of said first cap comprise at least one foot extending in a direction of the main axis from the lower face of the plate, said at least one foot comprising a claw extending in a plane substantially perpendicular to the main axis from the at least one foot towards said central pillar, said at least one foot being made of an elastic material to allow the fitting of the at least one foot into a thread of the screw, and wherein an inner surface of the cavity forms a complementary cavity of the central pillar so that said central pillar is adapted to be inserted into said cavity;

the claws of the first cap are interlocked in the thread of the screw.

13. The fastening according to claim 12, wherein:
the nut defines a star-shaped profile (P) at twelve vertices of angular period 30°;
the outer surface of the first cap has twenty-four tabs separated by an angular pitch of 15°.

14. A method for implementing a fastening according to claim 1, characterized in that it comprises the following steps:

inserting the screw having a longitudinal axis ($\Delta$) into a previously made hole in a structural assembly that includes structural elements to be held together;

placing the nut on the screw by applying a tightening torque;

placing the first cap on the screw;

placing the second cap;

if the second cap engages with the first cap but does not cooperate with the tightening portion of the nut, removing said second cap in the direction of the longitudinal axis ($\Delta$), rotating said second cap clockwise or counterclockwise about said longitudinal axis, by an angle equal to $\theta/2k$, then resetting said second cap, this step being repeated, always in the same direction of rotation, until the second cap is engaged on the tightening portion of said nut;

inserting the pin into the openings.

* * * * *